US009554281B2

(12) United States Patent
Chiang et al.

(10) Patent No.: US 9,554,281 B2
(45) Date of Patent: *Jan. 24, 2017

(54) FRACTIONAL FREQUENCY REUSE SCHEMES ASSIGNED TO CLUSTERS OF RADIO NODES IN AN LTE RADIO ACCESS NETWORK

(71) Applicant: SpiderCloud Wireless, Inc., San Jose, CA (US)

(72) Inventors: Han-Ting Chiang, West Lafayette, IN (US); Krishna Sayana, San Jose, CA (US); Brian Dunn, Menlo Park, CA (US); Hithesh Nama, San Jose, CA (US); Peter J. Worters, San Carlos, CA (US)

(73) Assignee: SPIDERCLOUD WIRELESS, INC., Milpitas, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/075,509

(22) Filed: Nov. 8, 2013

(65) Prior Publication Data
US 2015/0133129 A1    May 14, 2015

(51) Int. Cl.
*H04W 16/12* (2009.01)
*H04W 16/10* (2009.01)

(52) U.S. Cl.
CPC .................... *H04W 16/10* (2013.01)

(58) Field of Classification Search
None
See application file for complete search history.

(56) References Cited

U.S. PATENT DOCUMENTS

| | | | |
|---|---|---|---|
| 2004/0117226 A1* | 6/2004 | Laiho et al. ...................... 705/7 |
| 2006/0182065 A1 | 8/2006 | Petrovic et al. |
| 2007/0086406 A1* | 4/2007 | Papasakellariou .... H04W 16/04 370/343 |
| 2007/0177501 A1* | 8/2007 | Papasakellariou .... H04W 24/00 370/229 |
| 2008/0080465 A1* | 4/2008 | Pajukoski et al. ............ 370/342 |
| 2008/0189394 A1* | 8/2008 | Ross ....................... H04L 45/46 709/219 |
| 2008/0274745 A1* | 11/2008 | Barak ................... H04W 16/02 455/447 |
| 2010/0062784 A1* | 3/2010 | Ornbo et al. ............... 455/452.1 |
| 2010/0087203 A1* | 4/2010 | Lee ..................... H04W 72/082 455/452.2 |
| 2011/0003598 A1* | 1/2011 | Ma ..................... H04W 72/0426 455/452.1 |
| 2011/0045831 A1* | 2/2011 | Chiu ................... H04W 72/082 455/436 |

(Continued)

*Primary Examiner* — Kimberly A Williams
(74) *Attorney, Agent, or Firm* — Stuart H. Mayer; Mayer & Williams PC

(57) ABSTRACT

Methods and systems are provided for allocating frequencies in a radio access network (RAN) that includes a plurality of radio nodes each associated with a cell and a services node operatively coupled to the radio nodes. In accordance with the method, the radio nodes (RNs) in the RAN are divided into a plurality of clusters of RNs. A fractional frequency reuse (FFR) pattern is generated for each cluster. Transmission resources are allocated to the radio nodes in each cluster in accordance with the respective FFR pattern that is generated for each cluster.

74 Claims, 11 Drawing Sheets

(56) References Cited

U.S. PATENT DOCUMENTS

| | | | |
|---|---|---|---|
| 2011/0081865 A1* | 4/2011 | Xiao | H04W 52/243 |
| | | | 455/63.1 |
| 2012/0122503 A1 | 5/2012 | Ma | |
| 2012/0157108 A1* | 6/2012 | Boudreau et al. | 455/450 |
| 2012/0157155 A1 | 6/2012 | Cho et al. | |
| 2013/0046889 A1 | 2/2013 | Tulino et al. | |
| 2013/0115968 A1* | 5/2013 | Wegmann | H04W 16/10 |
| | | | 455/452.1 |
| 2013/0196676 A1 | 8/2013 | Koudouridis | |
| 2013/0230010 A1 | 9/2013 | Kim | |
| 2013/0286954 A1 | 10/2013 | Ma | |
| 2014/0031049 A1* | 1/2014 | Sundaresan | H04W 16/02 |
| | | | 455/447 |
| 2015/0080003 A1 | 3/2015 | Sadek | |
| 2015/0131537 A1* | 5/2015 | Chiang | H04L 5/0057 |
| | | | 370/329 |
| 2015/0181465 A1* | 6/2015 | Dao | H04W 28/08 |
| | | | 370/235 |

* cited by examiner

FRACTIONAL FREQUENCY REUSE SCHEMES ASSIGNED TO CLUSTERS OF RADIO NODES IN AN LTE RADIO ACCESS NETWORK

BACKGROUND

Operators of mobile systems, such as Universal Mobile Telecommunications Systems (UMTS) and its offspring including LTE (Long Term Evolution) and LTE-Advanced, are increasingly relying on wireless small cell radio access networks (RANs) in order to deploy indoor (as well as dense outdoor) voice and data services to enterprises and other customers. Such small cell RANs typically utilize multiple-access technologies capable of supporting communications with multiple users using radio frequency (RF) signals and sharing available system resources such as bandwidth and transmit power.

However, deployment of a large number of small cells can improve system-wide capacity in an area by providing cell-splitting gains. However, these systems result in unique challenges to a RAN operator. Users at cell edges often suffer from inter-cell interference since the received signal power from the serving cell is at the same level or even below the level of the received aggregated interference power from the adjacent cells. If the inter-cell interference is not well-handled, the capacity benefits from the small cell deployments could come at the cost of reliability and the general stability of the system. Reliability and stability of a RAN are often captured by an extensive set of Key Performance Indicators (KPIs) that essentially characterize the user experience in such a network. Unlike the deployments of macro cell networks, the deployments of small cell are more irregular in geometry. The shapes and sizes of the coverage areas of small cells can vary greatly. In addition, the load distribution between small cells is more asymmetric when compared with that of macro cells, which cover much larger areas. These impose significant challenges for managing small cell inter-cell interference and require techniques to take all the irregularities in geometry and load distribution into consideration as part of the small cell network design. Specifically this means interference management schemes need to be designed differently. Some key focus areas for the design are i) scalability (can support large number of small cells) and ii) stability (autonomously account for different performance requirements/network conditions)

There are several approaches that may be used to reduce the influence of inter-cell interference. For example, one approach is to employ a frequency reuse pattern and by that, avoiding usage of the same frequency bands at adjacent cells. A drawback of this approach is that only a small fraction of the frequency resources (equal to the reuse factor) may be used in each cell, while preferably one would like to reuse a significant part of the whole available frequency spectrum within every cell. Another approach to improve the spectral efficiency in cellular systems is a "fractional frequency" approach, which divides the frequency resource into two parts or more. The first part is used for the edge of cell regions, while the second part is used for the regions closer to the radio node. The first part is used with a designated reuse factor, appropriate for the cell edges where users are more vulnerable to interference due to their reduced signal power. The second part (covering the inner part of the cell), however, can be used with a higher reuse factor because the Signal to Interference and Noise Ratio (SINR) is higher in this part of the cell in view of both the stronger desired signal and the larger distance from the interferers. An example of such approach, for example is to divide the available channels into 4 channels, three of which are used in a reuse-3 pattern for covering the cell edge regions, while the fourth channel is used in a reuse-1 manner for the inner regions of the cells.

Despite the use of the well-known aforementioned techniques for reducing inter-cell interference, additional improvements in cell-edge user performance are desirable, particularly when small cells are employed.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to implementations of principles disclosed here provide an LTE E-RAN employing a hierarchical architecture with a central controller or coordinator controlling multiple LTE radio nodes. The central controller or coordinator may form a portion of a services node in communication with radio nodes that service user equipment or UEs. These radio nodes may be configured as individual cells (i.e, with different physical cell identities (PCIs)) within the small cell network. The systems and methods provide for a fractional frequency reuse ("FFR") scheme with a central controller that dynamically computes the FFR allocations at individual radio nodes and configures the corresponding individual MAC schedulers within each radio node to improve cell-edge users' experience or more generally to meet well-defined KPIs for the system. The systems and methods operate in a manner that is scalable so that its performance gains are retained even for large system deployments.

In an exemplary method, the central controller may obtain topology information concerning the radio nodes. The central controller divides the radio nodes into two or more clusters of radio nodes based on their topology and generates a fractional frequency reuse pattern for each cluster. The services node then allocates transmission frequencies to the radio nodes in each cluster in accordance with the respective FFR pattern that is generated for each cluster. A transmission frequency could correspond to a subband, which is itself a set of resource blocks (RBs) as defined in LTE (specifically 3GPP specifications TS 36.211, 36.212, 36.213).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 7 is a flowchart illustrating one exemplary method for establishing a mobile communications network that includes a small cell RAN controlled by a services node in an environment such as a building, residence or the like.

Like reference numerals indicate like elements in the drawings. Elements are not drawn to scale unless otherwise indicated.

DETAILED DESCRIPTION

Figure 1:
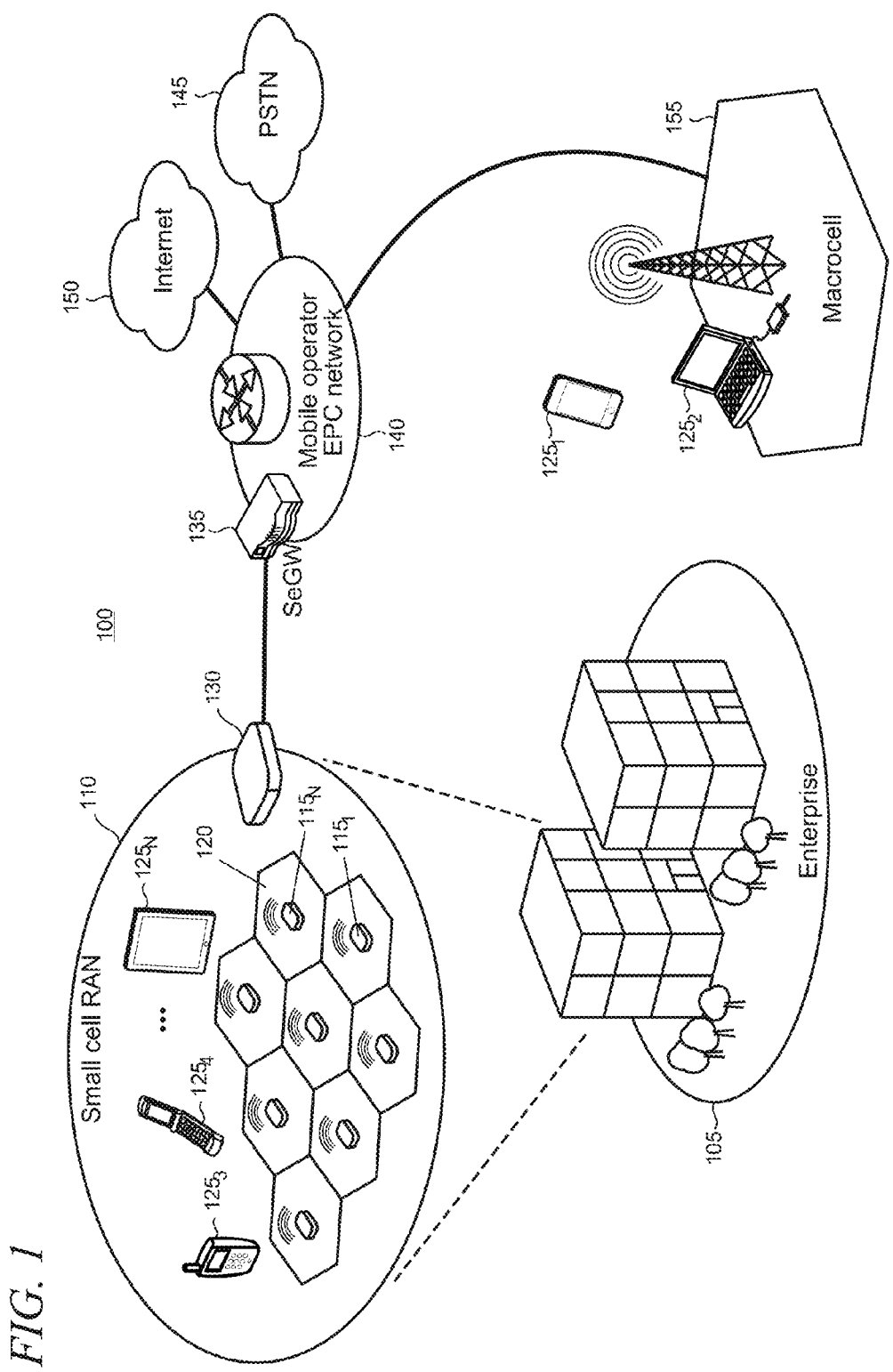
FIG. 1 shows an illustrative mobile telecommunications environment in which the present LTE FFR improvement may be practiced.

FIG. 1 shows an illustrative mobile telecommunications environment 100 in which the present invention may be practiced. The mobile telecommunications environment 100, in this illustrative example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the present principles described herein may also be applicable to other network types and protocols. For example, other network types and protocols that may be employed include, without limitation HSPA, LTE, CDMA2000, GSM, IEEE 802.11/Wi-Fi, 802.16 etc. or a mixture of technologies such as with a multi-standard radio (MSR) node (e.g., LTE/HSPA, GSM/HS/LTE, CDMA2000/LTE, etc).

The environment 100 includes an enterprise 105 in which a small cell RAN 110 is implemented. The small cell RAN 110 includes a plurality of radio nodes (RNs) 1151 . . . N. Each radio node 115 has a radio coverage area (graphically depicted in the drawings as a hexagonal shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 1251-N in FIG. 1). However, the foregoing is intended to be illustrative and the solutions described herein can be typically expected to be readily scalable either upwards or downwards as the needs of a particular usage scenario demand.

In this particular illustrative example, the small cell RAN 110 includes one or more services nodes (represented as a single services node 130 in FIG. 1) that manage and control the radio nodes 115. In alternative implementations, the management and control functionality may be incorporated into a radio node, distributed among nodes, or implemented remotely (i.e., using infrastructure external to the small cell RAN 110). The radio nodes 115 are coupled to the services node 130 over a direct or local area network (LAN) connection (not shown in FIG. 1) typically using secure IPsec tunnels. In alternative implementations, the connection between the radio nodes 115 and services node 130 may be over a wireless link or wireless local area network (W-LAN) connection (not shown in FIG. 1). The services node 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
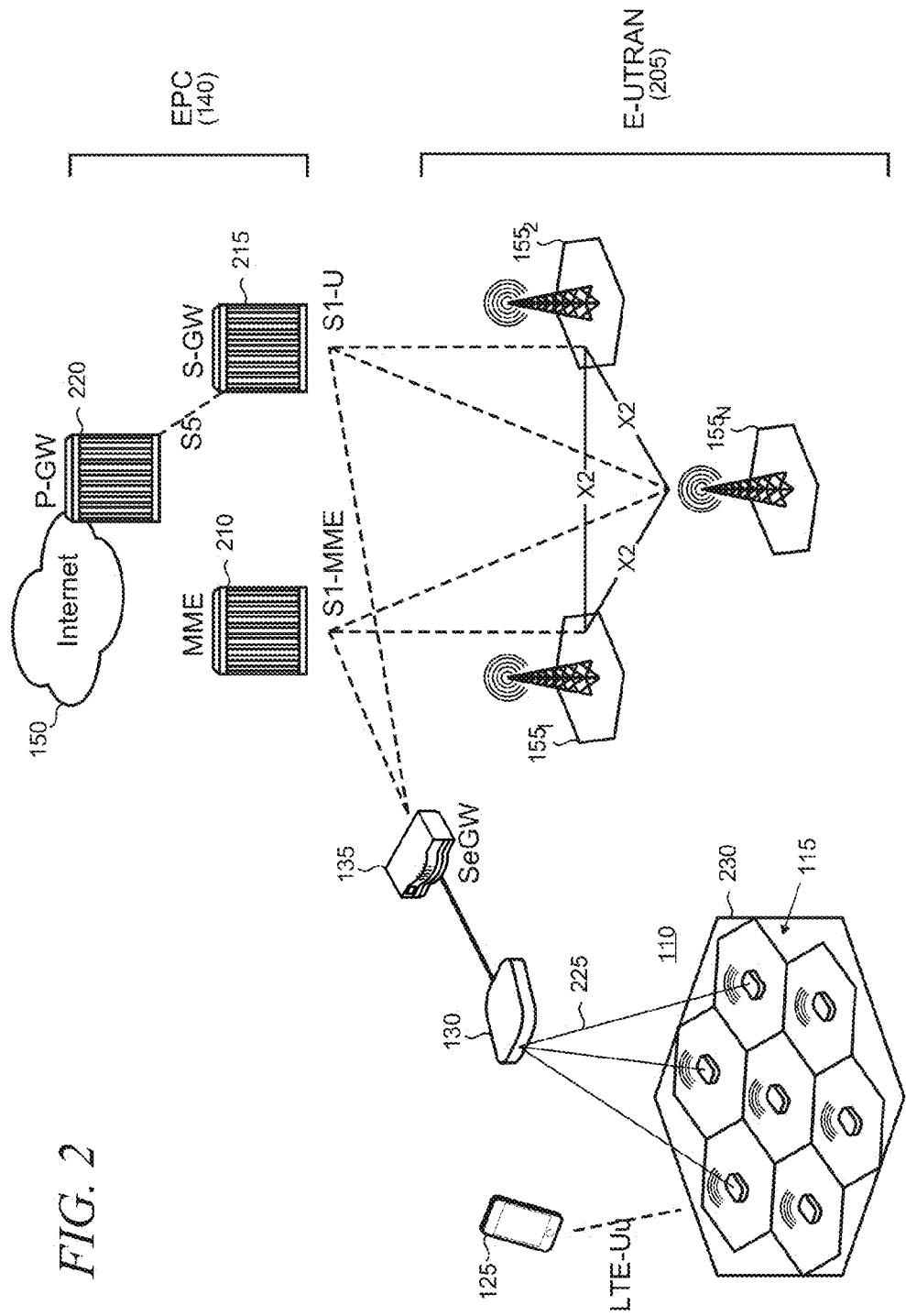
FIG. 2 shows details of an EPC (Evolved Packet Core) and E-UTRAN (Evolved UMTS Terrestrial Radio Access Network where UMTS is an acronym for Universal Mobile Telecommunications System) arranged under LTE (Long Term Evolution) with which a small cell network may interoperate.

Along with macrocells 155, the small cell RAN 110 forms an access network, i.e., an Evolved UMTS Terrestrial Radio Access Network (E-UTRAN) under 3GPP as represented by reference numeral 205 in FIG. 2. As shown, there is no standards defined centralized controller (similar to a Radio Network Controller (RNC) in UMTS/UTRAN) in the E-UTRAN 205, hence an LTE network architecture is commonly said to be "flat." The macrocells 155 are typically interconnected using an X2 interface and to the EPC 140 by means of an S1 interface. More particularly, the macrocells are connected to the MME (Mobility Management Entity) 210 in the EPC 140 using an S1-MME interface and to the S-GW (Serving Gateway) 215 using an S1-U interface. An S5 interface couples the S-GW 215 to a P-GW (Packet Data Network Gateway) 220 in the EPC 140 to provide the UE 125 with connectivity to the Internet 150. A UE 125 connects to the radio nodes 115 over an LTE-Uu interface.

The SeGW 135 is also connected to the MME 210 and S-GW 215 in the EPC 140 using the appropriate S1 connections. Accordingly, as each of radio nodes 115 in the small cell RAN 110 is operatively coupled to the services node 130 (as representatively shown by lines 225), the connections from the radio nodes 115 to the EPC 140 are aggregated to the EPC 140. Such aggregation preserves the flat characteristics of the LTE network while reducing the number of S1 connections that would otherwise be presented to the EPC 140. The small cell RAN 110 thus essentially appears a single eNB 230 to the EPC 140, as shown.

The LTE air interface uses Orthogonal Frequency Division Multiplexing (OFDM) for enhanced throughput and spectral efficiency. The air interface has a Transmission Time Interval (TTI) of 1 ms (also referred to as a subframe) along with other features to lower latency. The primary element used in scheduling transmissions is a "resource block" (RB), and resource blocks make up subframes which in turn make up radio frames. Each subframe includes both control regions and data regions that are multiplexed in time-domain, in frequency domain, or in both time and frequency domains. In one method, FFR schemes are used over the data part (referred to as PDSCH and PUSCH region in LTE) of the subframe, where the available resource can be divided into multiple sub-bands over the whole bandwidth.

One of the most significant issues in a multi-cell deployment is the performance of user equipment at cell edge. For example, a UE at a cell edge experiences significant interference from the downlink transmissions of adjacent eNBs in decoding the downlink transmissions from its own serving cell. As a result, the cell-edge spectral efficiency is significantly poorer than that in the interior of the cell. The LTE standard has introduced several coordination mechanisms to improve cell-edge performance.

Figure 3:
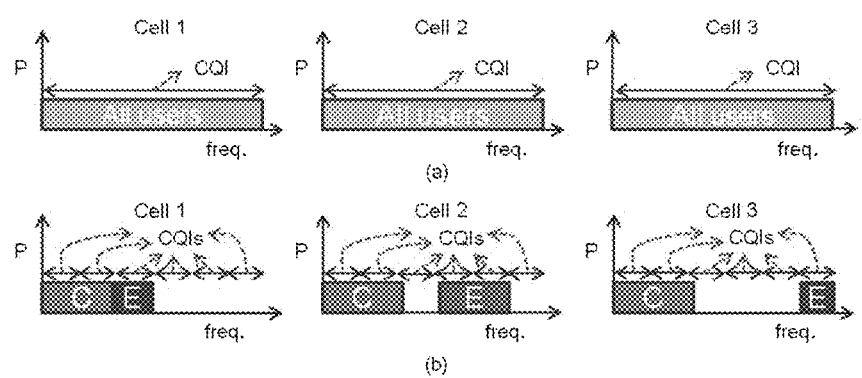
FIG. 3 illustrates an allocation of frequencies in a frequency reuse one scheme (FIG. 3a) and an exemplary fractional frequency reuse (FFR) scheme (FIG. 3b)

In one such mechanism, a fractional frequency reuse (FFR) scheme, uses non-overlapping resource blocks for cell-edge UEs of adjacent eNBs as illustrated in FIGS. 3a and 3b. In FIG. 3a all frequencies have a frequency reuse one scheme. The FFR scheme in FIG. 3b allocates dedicated frequency bands (edge bands) for each cell to create interference free or less-interfered frequency bands for cell-edge users. It also manages to maintain the average system performance by using a common center band (with a frequency reuse factor of one) for cell-center users. The FFR scheme can be viewed as a combination of the frequency reuse one scheme with higher (>1) frequency reuse factor schemes. As shown in FIG. 3b, the less interfered center users of all cells utilize the same frequency (center band) while the heavily interfered edge users in different cells are directed to non overlapped dedicated frequency bands (edge band) to create separation with each other. The scheduling decision is made based on UE-specific information such as sub-band Channel Quality Information (CQI), load, and Quality of Service (QoS). The FFR scheme described below is scalable and has the ability to autonomously optimize and select the desired FFR pattern for each RN depending on the various performance targets, e.g., key performance indicators (KPIs) that are employed.

The FFR scheme described herein may be employed with a central coordinating entity, e.g., hosted on a services node, that dynamically computes the FFR allocation and accordingly configures the individual MAC schedulers within each radio node. Use of a central coordinating entity provides a number of benefits, in particular, frequency allocations can be calculated much more efficiently and rapidly as opposed to distributed algorithms in which a mesh of eNBs would exchange messages and generally take much greater computational time to converge to a global optimal solution.

In the centrally coordinated FFR scheme described herein the services node is able to collect information and measurements from the radio nodes and act on it at the same time. The information may include the topology of the radio nodes, the geometry of individual UEs, the distance between UEs and each radio node, the number of UEs served by individual radio nodes, the load of the UEs and RNs, and Quality of Service (QoS) requirements of the UEs. The topology of the radio nodes and the geometry of the UEs may be obtained from measurements of signal strength (e.g. RSRP in LTE, CPICH RSCP in HSPA, GSM BCCH RSSI, CDMA2000 1xRTT Pilot Strength, CDMA2000 HRPD Pilot Strength etc) at the radio nodes (RN sniffing) and UEs respectively. Note that topology specifically refers to RN-RN pairwise metrics, whereas geometry refers to UE to RN pair-wise metrics, and RSRP or RF pathloss are examples.

The centrally coordinated FFR scheme employs two primary processes:
1. A radio node scheduling process, which runs at each radio node.
2. An FFR pattern generation process, which runs at the services node.

The subject matter of this disclosure focuses primarily on the FFR pattern generation process performed by the services node. However, such FFR pattern generation modules may take into account the behavior of the radio node scheduling process in some of the methods. An FFR pattern at a radio node may be defined essentially as i) the set of subbands (or transmission frequencies) that it is allowed to transmit on and ii) the set of frequencies that it is precluded from transmission.

More generally, an FFR pattern could describe the power constraints/restrictions on one or more subbands. The methods described herein can be adapted to this more general definition. In practice, many of the benefits can be obtained from using either a full power or zero power transmission in individual subbands. Accordingly, for purposes of illustration only and not as a limitation on the subject matter disclosed herein the following discussion will focus on FFR patterns that operate in this binary manner.

The set of frequencies in which transmission is allowed and the set of frequencies in which transmission is precluded may change each subframe according to a time-domain pattern, in which case the FFR pattern specifies both frequencies and subframes in which transmission is allowed or precluded. The time-domain pattern may be generated such that cell edge resources can be shared closer to a desired ratio. Alternatively, the time-domain pattern may reflect constraints imposed by neighboring macrocells.

Figure 4:
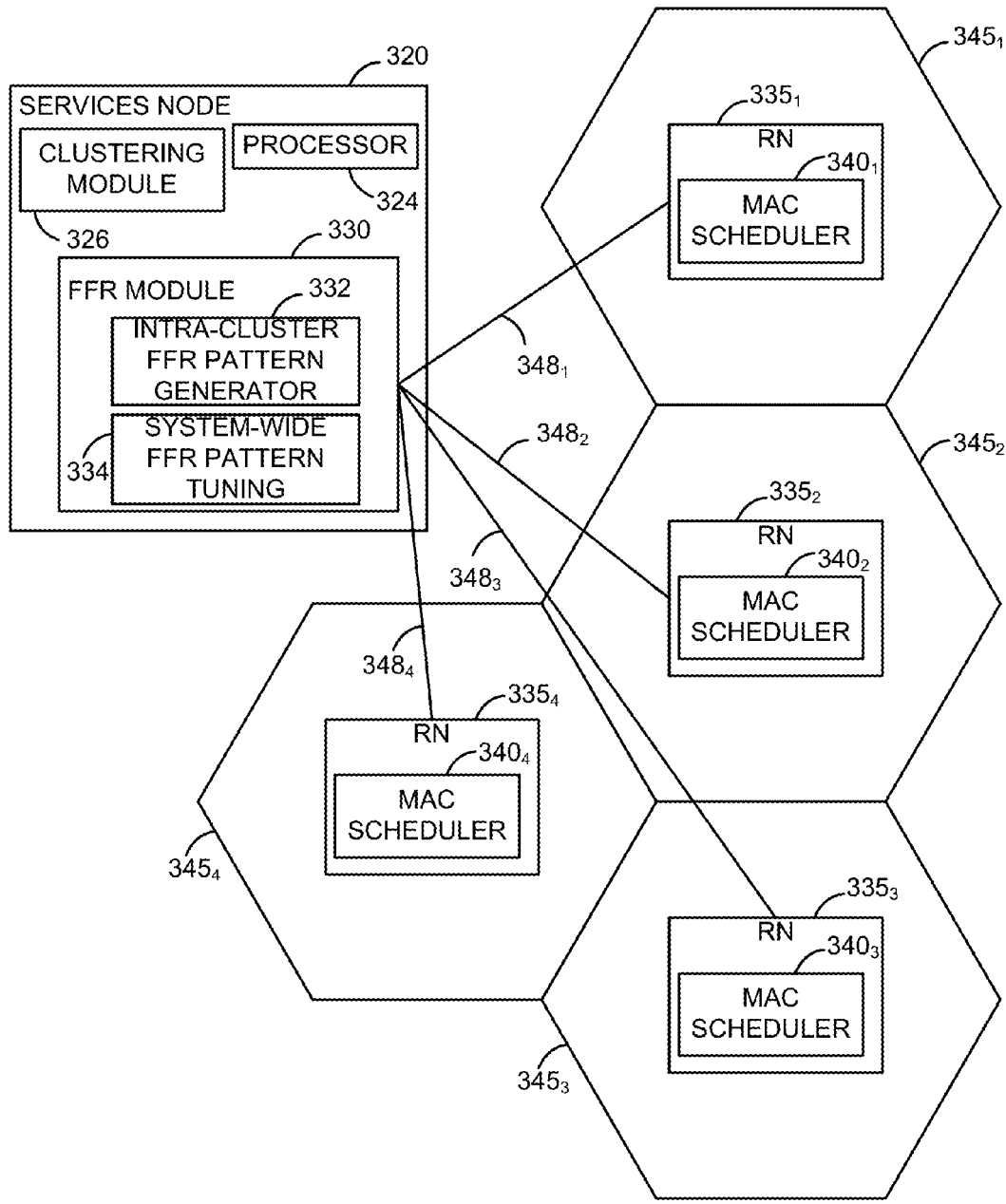
FIG. 4 illustratively shows a simplified functional block diagram of illustrative hardware infrastructure for a services node, as well as illustrative radio nodes, which may be utilized to implement the present principles.

Referring now to the schematic layout of FIG. 4, an exemplary services node 320 is illustrated in radio communication with a number of cells $345_1$-$345_4$. Each cell $345_i$ includes a radio node $335_i$ within. Each radio node $335_i$ includes at least one MAC scheduler $340_i$. The MAC scheduler $340_i$ is responsible for scheduling transmissions in both the uplink and downlink directions for the UEs it serves.

The services node 320 includes a processor 324 and a number of modules to carry out its desired functionality, including a clustering module 326 and an FFR module 330.

The clustering module 326 partitions the radio nodes controlled by the services node into multiple clusters of radio nodes using the topology of the radio nodes as input. In one implementation an approximately fixed number of RNs is targeted per cluster. The FFR process involves the selection of the center band region and an edge band region that is common across all clusters (and the corresponding radio nodes). Within each cluster, FFR patterns are further allocated to the radio nodes, where the services node allocates the available edge bands to individual radio nodes. Use of a clustering approach can completely eliminate intra-cluster interference and significantly reduce the inter-cluster interference on the edge band regions.

The parameters which are used as inputs into the clustering module 326 include the designated numbers of clusters and the cluster size. Each cluster represents an interference group such that the radio nodes within the same cluster interfere with each other more strongly than with radio nodes in other clusters. Such a definition of the interference relationship may be expressed in an average sense. For example, an intra-cluster distance metric may be minimized and inter-cluster distance metric may be maximized for this purpose. Similar metrics related to absolute distance based topology (ex: using X, Y, Z coordinates) or RF topology (pathloss or RSRPs between nodes) can also be used.

Figure 5:
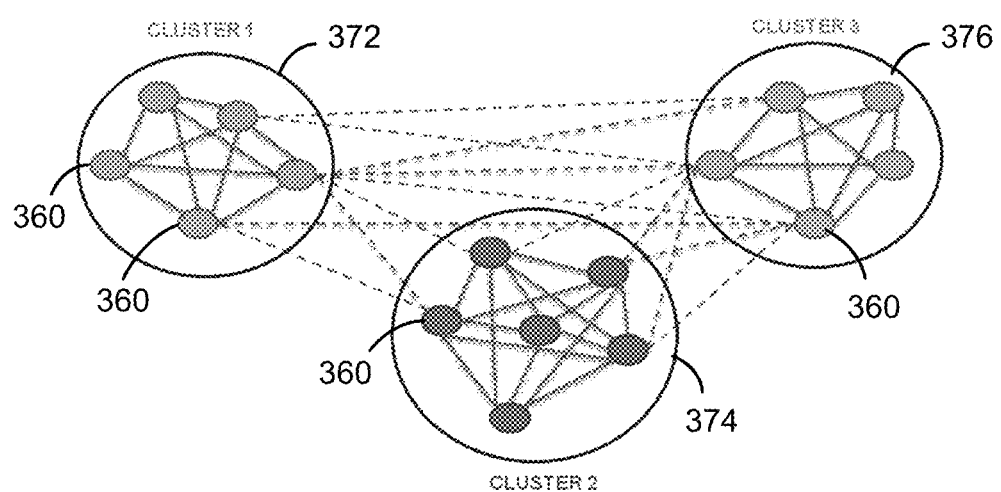
FIG. 5 illustrates a set of radio nodes in a RAN which is divided into three clusters.

An example in which a set of radio nodes 360 associated with a common services node is arranged into three clusters 372, 374 and 376 is shown in FIG. 5. The solid lines between nodes indicate strong interference and dashed lines indicates weak interference. Interference between radio nodes that are not connected by either a solid or dashed line is negligible.

Along with values for the parameter inputs of cluster size and the number of clusters, the inputs to the clustering module 326 include the information containing the topology of RNs as described, which can be expressed in terms of their explicit positions (e.g., GPS type X, Y location+floor information) and/or a relative metric such as pair-wise RSRPs (i.e., topology) between radio nodes in an LTE system.

Hierarchical clustering algorithms, for example, "Group Average Agglomerative Hierarchical Clustering" and "Ward's Agglomerative Hierarchical Clustering", may be used to group radio nodes when only pair-wise RSRP or pathloss values between radio nodes are available (i.e., the topology information that is available when the network is booted and a neighbor scan is completed). Other methods like "K-means" and "C-means fuzzy clustering" can be employed when the absolute metrics like radio nodes positions/locations are available. The use of such clustering techniques can facilitate the FFR scheme's ability to scale up to accommodate a large number of radio nodes robustly and effectively. This is achieved by using a hierarchical approach to FFR pattern design using clustering as will be further described.

After the radio nodes have been arranged into clusters, the intra-cluster FFR pattern generator 332 in the FFR module 330 generates various FFR patterns for each cluster. The patterns are generated based on information obtained from the radio nodes within each cluster and values for various parameters that are input to the intra-cluster FFR pattern generator 332. Such parameters which may be specified include the FFR type, the size of the center band, the scheduling granularity of the center band and the scheduling granularity of the edge band. The FFR type specifies the criterion to be used for allocating the edge bands to the radio nodes in each cluster. Illustrative FFR types that may be employed will be discussed below. The size of the center band specifies the number of frequency resource blocks (RBs) contained in the center band. The scheduling granularity of the center band divides the RBs in the center band into RB groups which are to be scheduled together. RB groups may correspond to a sub-band or transmission frequency as described earlier, and may comprise a set of contiguous or non-contiguous resource blocks. The size of the RB group depends on the granularity that is chosen. Likewise, the scheduling granularity of the edge band divides the RBs in the edge bands into RB groups which are to be scheduled together. The intra-cluster FFR pattern generator 332 has the flexibility of generating FFR patterns using different methods, which may be selected by the particular information obtained from the radio nodes within each cluster and the values for the aforementioned parameters, when available.

The types of FFR schemes that may be employed can be broadly divided into two categories: uniform FFR and load-based FFR.

In uniform FFR, the edge bands are uniformly distributed among the RNs in a cluster. In other words, each RN is allocated edge bands having the same size. This scheme requires minimal information from the radio nodes.

In a variation of the above method, a fixed FFR scheme may be used which similarly does not rely on information from the radio nodes. However, the allocation of the edge bands need not be uniform. The fixed sizes within each RN are determined based primarily on the topology i.e., RF environment and any known/expected radio node usage. As an example, for RNs that are known to be at the edge of the network and hence are needed to support ingress and egress of users, preferentially more edge bands may be assigned. As another example, for RNs that are known to be in locations where higher user density is expected (like conference rooms indoors), preferentially higher number of sub-bands may be assigned.

In load-based FFR, the size of the edge band that is allocated to each RN is adjusted according to the load information collected from the RNs. The load information could be one or more of the load of the RN, the number of active UEs served by the RN, and UE-specific information such as RSRP, load, quality of service (QoS) requirements, and sub-band channel quality indicators (CQIs), for example. They could also include information like buffer status or latencies or current or past KPIs maintained per RN or per UE. In one illustrative load-based FFR scheme, the edge band is allocated with a size in proportion to the number of active UEs associated with each RN. Another example is to allocate the edge band in proportion to the total expected aggregate data rate across the QoS bearers of the UE. A configurable weighted priority can also be used. Moreover, it is also possible that RNs having very few users, i.e., RNs which are lightly loaded, may not be allocated any edge bands. In one method, a particular traffic or usage or application type may be prioritized. As an example, a number of voice users at each RN may be used for deriving the FFR patterns.

Figure 6:
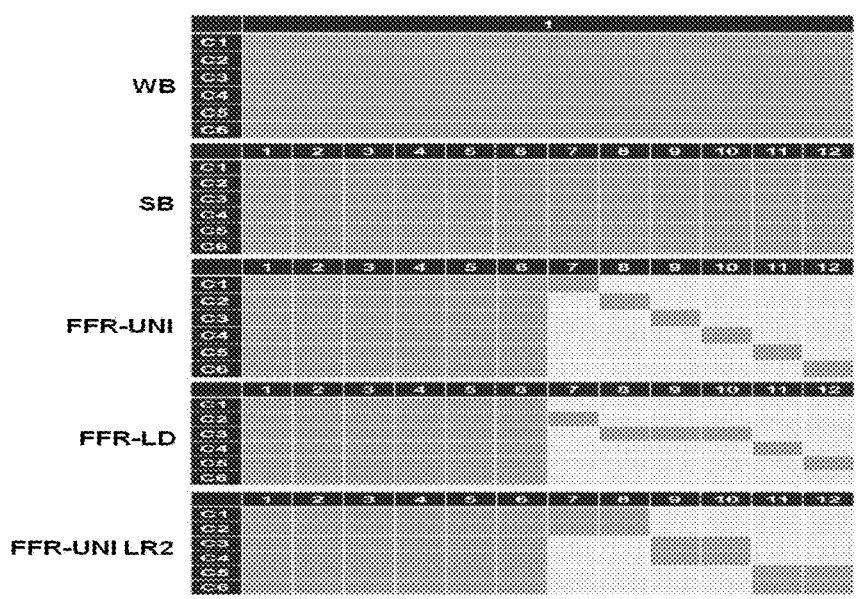
FIG. 6 illustrates various exemplary types of FFR schemes according to present principles.

FIG. 6 illustrates some examples of different types of frequency allocation schemes that may be employed. Each scheme is shown for a cluster of 6 RNs denoted C1-C6. The frequency band is divided into twelve sub-bands, which are shown along the rows for each RN in a given scheme. Shaded sub-bands indicate sub-bands that are allocated for use by their respective RNs and unshaded sub-bands indicate sub-bands that are not allocated for use by their respective RNs. In this way the corresponding sub-band allocations for each scheme are illustrated.

The first two schemes, wide-band (WB) and sub-band (SB), are frequency allocation schemes that do not employ FFR and are described as a reference mode of operation. In particular, in the WB scheme frequency selective diversity is not exploited among the UEs and the RNs in every cell occupy the entire available bandwidth and schedule UEs in a frequency agnostic way. In other words, they do not exploit the subband/frequency specific channel quality. Also, only a single UE is typically assigned a given transmission time interval (TTI). In the SB scheme, the frequency resources are allocated on a sub-band basis to exploit frequency selective diversity and multiple UEs are assigned a given TTI. The second scheme improves performance of the system over the WB schemes in a rich multipath environment.

The final three frequency allocation schemes shown in FIG. 6, FFR with uniform allocation (FFR-UNI), load-based FFR (FFR-LD) and FFR UNI with 2 RNs sharing an edge band (FFR-UNI LR2), are all FFR schemes.

The FFR-UNI and FFR-LD schemes respectively correspond to the uniform FFR and load-based FFR schemes discussed above. As shown, in the FFR-UNI scheme each RN is assigned a single, dedicated edge sub-band. Likewise, in the FFR-LD scheme different RNs are assigned a different number of edge sub-bands, based on their respective loads. That is, the RNs are each allocated a total edge band that does not overlap with other edge bands in the cluster, but the size of each total edge band may be different from RN to RN. In this example, for instance, RNs C2, C4 and C5 are each allocated a single edge sub-band, whereas RN C3 is allocated three edge sub-bands.

The final FFR scheme shown in FIG. 6, FFR-UNI LR2, is an example of a scheme that may be used with either a uniform or a load-based FFR scheme. In this scheme multiple RNs (but not all the RNs in the same cluster) can share edge bands instead of allocating a dedicated edge band to each RN. In this case the reuse ratio (which otherwise is equal to the number of RNs in the cluster) is lowered. RNs within the same cluster can be chosen, for example, to share an edge band based on their interference topology. The RNs in a cluster that interfere less with each other, such as those RNs that receive low RSRPs from one another, may be selected to share the same edge band. In the example shown in FIG. 6 RNs C1 and C2 share a common edge band (comprising two edge sub-bands), RNs C3 and C4 share a common edge band (comprising two edge sub-bands) and RNs C5 and C6 share a common edge band (comprising two edge sub-bands). This specific variation of FFR scheme may be used to improve the effective reuse ratio of FFR and hence the system performance. In one method, this scheme can be generalized to allow sharing of a different number of RNs (instead of a fixed value like 2) in each sub-band.

To avoid accumulating interference on the edge bands allocated to RNs in different clusters, the center bands of the FFR patterns of the clusters may all be aligned with one another. In other words, for all clusters assigned to a given services node, the center bands may share the same frequency bands and have the same size. However, in some cases there may be a need for flexibility to support different center band sizes in different clusters if there are significant differences in cluster traffic patterns or RF conditions. In these cases, the algorithm will then assign the center sub-bands such that there is as much alignment as possible, i.e., alignment may not be applied in a strict sense. For example if M1, M2, M3 are center bands for clusters C1, C2, C3, then the assignment of these sub-bands is such that $M1 \subset M2 \subset M3$. It is clear that in this case, sub-bands in cluster 1 that are in M3, but are not in M1 may be used as edge bands within cluster 1 (increasing edge region in C1), but may not receive as much protection from inter-cluster interference.

Referring again to FIG. 4, the system-wide FFR pattern tuning module 334 of the FFR module 330 combines the FFR pattern of the individual clusters into a system-wide FFR pattern. Such combination methods do not further change the size of the center/edge subbands within each cluster, but may readjust them to further improve SNR in the edge bands by aligning edge bands of RNs from different clusters. To elaborate, the RNs in different clusters share edge bands as a result of the intra-cluster FFR patterns that have been assigned to them by the intra-cluster FFR pattern generator 332. As a result inter-cluster edge-band interference may arise, though intra-cluster interference is eliminated. The system-wide FFR pattern module 334 further adjusts or tunes the FFR pattern of certain example clusters to reduce this interference. For example, a selected RN, RN1, in cluster 1 may be assigned an edge-band on which RN1 observes the lowest interference from other clusters. Note that this step can be performed in several different ways. In one method, a sequential approach can be used, for example, starting from a first cluster where RNs can be arbitrarily assigned, and then moving on to second cluster and assigning RNs in each sub-band such that interference from cluster 1 is minimized, and so on. In another method, a joint optimization approach can be used, where a certain KPI can be maximized over the possible assignments. An example of the KPI could be the sum rate over the clusters and over the edge bands. Another example could be maximizing the minimum rate.

A given system-wide FFR pattern generated by the FFR module 330 may be updated at a rate that may depend on a variety of factors including, for example, the rate at which channel conditions change, load variations and the long term topology between cells. The dynamics of variations in the system-wide FFR pattern can be determined according to the additional gains that are realized. Tradeoffs in performance and complexity are factors that may be used to determine the update frequency. For example, the signaling load on the links between the services node and the radio nodes may be taken into account when determining a suitable update frequency.

An update to the FFR pattern generation may also be triggered by additional events that arise from changes in the network. Examples of such changes could include failure of one or more RNs (i.e, RN no longer able to transmit and serve UEs), bring-up of an RN (adding it to the network). In case of such a network event, some or all of the modules of the FFR algorithm may be affected. In one method, clustering may be performed simply deleting the RN from the corresponding cluster or adding a new RN to the 'closest' cluster, where the closeness is defined based on a pairwise distance metric (RSRP, RF Pathloss) as defined earlier. Further FFR patterns may be reassigned within the corresponding cluster.

Figure 7:
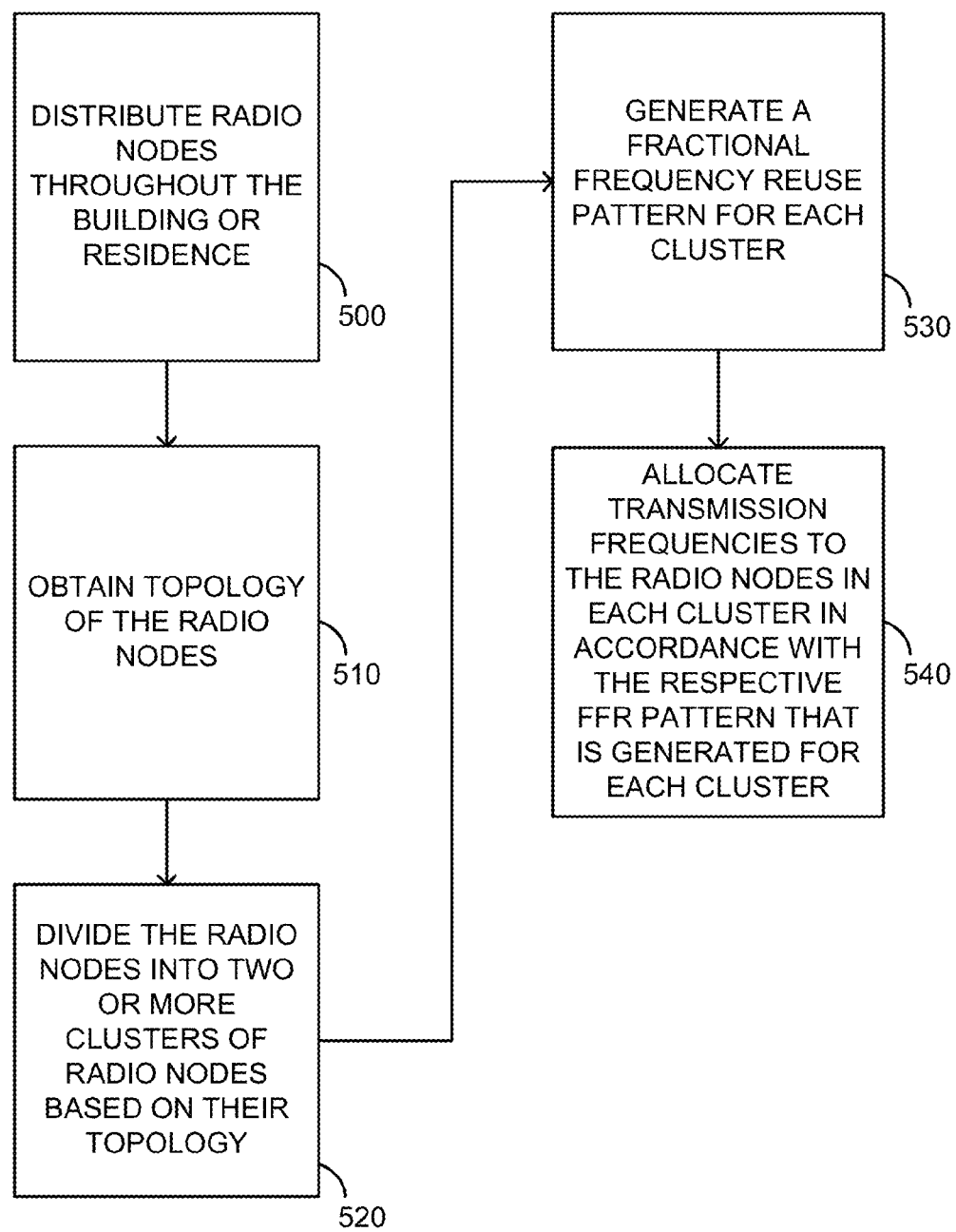

FIG. 7 is flowchart illustrating one exemplary method for establishing a mobile communications network that includes a small cell RAN controlled by a services node in an environment such as a building, residence or the like. The method begins at block 500 when a series of radio nodes are distributed throughout the environment. At block 510 the services node obtains topology information of the radio nodes. At block 520 the services node divides the radio nodes (RNs) into two or more of clusters of radio nodes based on their topology. Next, at block 530 the services node generates a fractional frequency reuse pattern for each cluster and finally, at block 540 the services node allocates transmission frequencies to the radio nodes each cluster in accordance with the respective FFR pattern that is generated for each cluster.

Uplink vs Downlink

The same sequence of operations described above for downlink transmission also can be used to assign uplink frequencies for use by each cell. In this case cell center and cell edge frequencies are those used for transmission by UE and reception by one or more radio nodes in the RAN. In general, the assignment of cells to clusters and the FFR pattern for each cell may be different for uplink and downlink transmission. The size of the cell center and cell edge region for uplink may differ from downlink to allow for a different tradeoff between cell edge coverage and cell center throughput.

For load-based FFR, different uplink and downlink load and QoS requirements can be accommodated for by assigning different FFR patterns for uplink and downlink. Alternatively, identical FFR patterns can be assigned for uplink and downlink transmission on the same cell to reduce signaling load or to allow for more frequent FFR pattern updates for the same signaling load. In this case a combined uplink and downlink load metric is used for FFR pattern generation. For example, a weighted sum of uplink and downlink load.

Scheduling granularity may differ on uplink and downlink, and it may not be possible to schedule the same set of frequencies on uplink and downlink. For example, uplink cell edge resources can be allocated as a contiguous set of resource blocks to accommodate a single-carrier uplink physical layer such as in LTE. On the downlink, cell edge resources can be allocated to align with the sub-bands used for UE sub-band CQI reporting.

For both uplink and downlink, cell edge interference represents the degree to which clusters are separated from each other and is a measure of the quality of the clustering assignment. Each cell can keep track of the inter-cluster (cell edge) interference level and send periodic reports to the services node. The clustering algorithm can then use these measurements to select from possible clustering assignments.

Example

Figure 8:
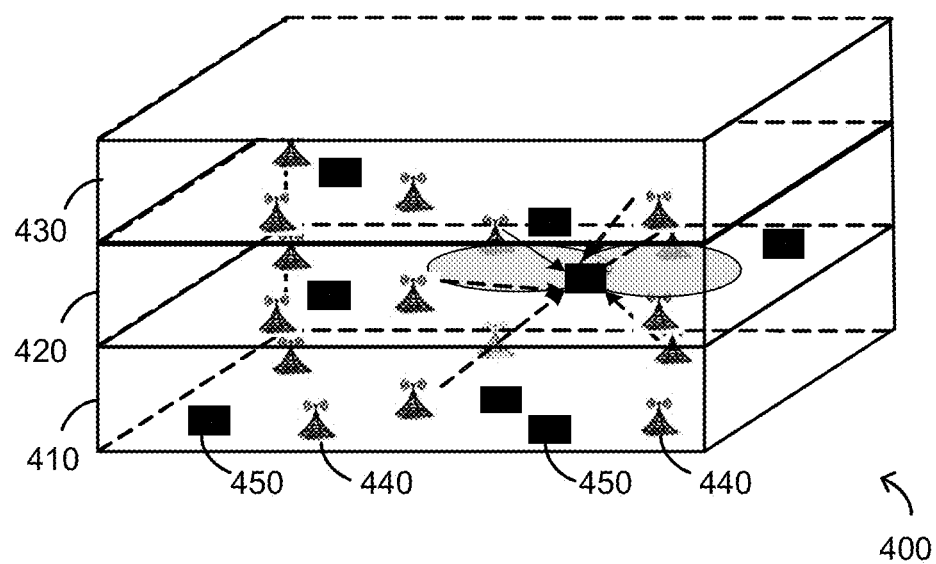
FIG. 8 illustrates a three story building in which a small cell network according to present principles may be deployed.

FIG. 8 shows a building 400 having three floors 410, 420 and 430. A small cell RAN network is to be deployed for an enterprise in the building. As shown, radio nodes 440 and UEs 450 are randomly placed over the floors.

Clustering is performed in the radio nodes 440 using Ward's Agglomerative Hierarchical Clustering Algorithm. This algorithm is chosen as being a suitable clustering algorithm which can be used with a relative metric such as pair-wise RSRPs or associated RF pathloss (i.e., topology), which is used as the input to the algorithm. Since the radio nodes are deployed over 3 floors the number of clusters is set to three to check if the algorithm autonomously separates RNs on different floors.

Figure 9:
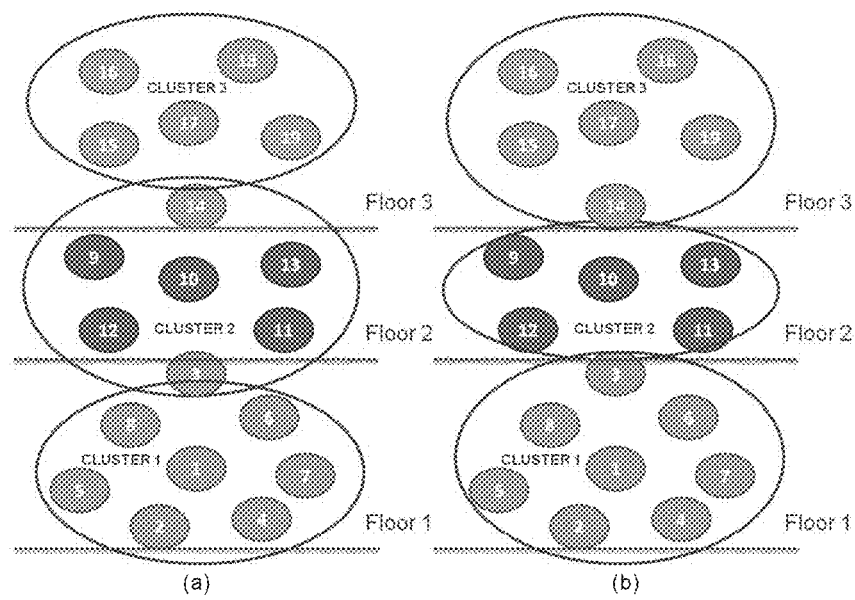
FIGS. 9a and 9b illustrate exemplary results of a clustering process performed on the radio nodes in the small cell network of FIG. 8.

An illustration of the clustering results on a random drop modelling a deployment of radio nodes is given in FIG. 9a for a 10 dB penetration loss between floors and in FIG. 9b for a 20 dB penetration loss between floors. The results show that even with only a relative metric such as pair-wise RSRPs between RNs, the Ward's Agglomerative Hierarchical Clustering Algorithm can sufficiently recognize and separate RNs on different floors. The 'errors' in the case of 10 dB penetration loss might occur on those RNs that are on the perimeters of floors. Two RNs are misplaced in clusters when the penetration loss is 10 dB, while RNs on the same floors are grouped together correctly when the penetration loss is 20 dB. This may be perfectly normal, and not an error as RNs are to be grouped based on their topology and not their physical floor location. In that sense, in an actual deployment, a clustering algorithm autonomously accounts for any variations in different indoor deployments.

In one method, a clustering algorithm may use any available side information, in addition to autonomously measurable RF metrics, to improve the performance of the algorithm. For example, GPS coordinates and floor information can be used as the additional side information. These may in turn be available from a GPS receiver or some of this information corresponding to each radio node may be manually input/configured at the SN or RNs.

Figure 10:
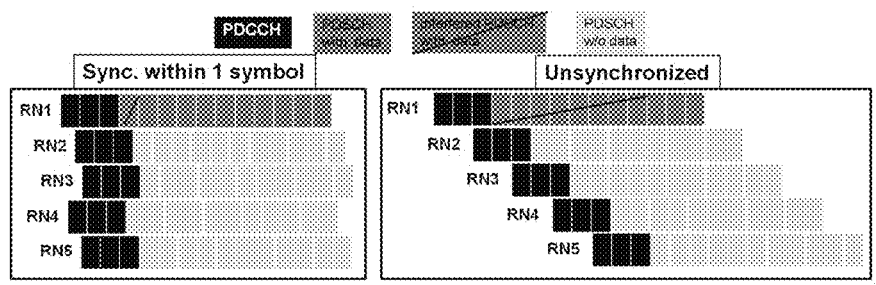
FIG. 10 illustrates the impact of synchronization of control channels by the radio nodes.

Although the FFR schemes belong to frequency-domain interference coordination techniques, synchronization should still be considered. This is because that Physical Downlink Control Channel (PDCCH) in LTE occupies the entire bandwidth (with a distributed allocation of resources), and the FFR scheme is primarily employed for Physical Downlink Shared Channel (PDSCH). If radio nodes are not perfectly synchronized with each other, the PDCCH of a RN could interfere with the PDSCH of nearby RNs even if FFR schemes are configured. An illustration of the impact of synchronization is given in FIG. 10. For example, under frequency domain duplex (FDD) mode and Type 1 frame structure [3GPP 36.211], the duration of a sub-frame includes 14 OFDM symbols. Typically, the PDCCH occupies the first $3/14$ fraction of the time of a sub-frame, i.e., 3 OFDM symbols. Under FFR schemes, if RNs are synchronized within an OFDM symbol, the performance loss when compared with the case of perfect synchronization is approximately bounded by $1/11$. This is because at most 1 out of 11 OFDM data symbols are compromised by the interference from the PDSCHs of adjacent cells. However, the impact could be significant without synchronization as shown on the right in FIG. 10.

In one method, information related to synchronization is used in the design of FFR patterns. For example, such information could include the expected or measured timing error statistics, where such timing error is the difference in sub-frame start timing among RNs. In another example, physical control channel configuration information could be used in the design of FFR patterns. Such control configuration information could include, but not limited to number of resources allocated to control channel (like number of OFDM symbols in the downlink), usage statistics or load of the control channel region of individual RNs.

Figure 11:
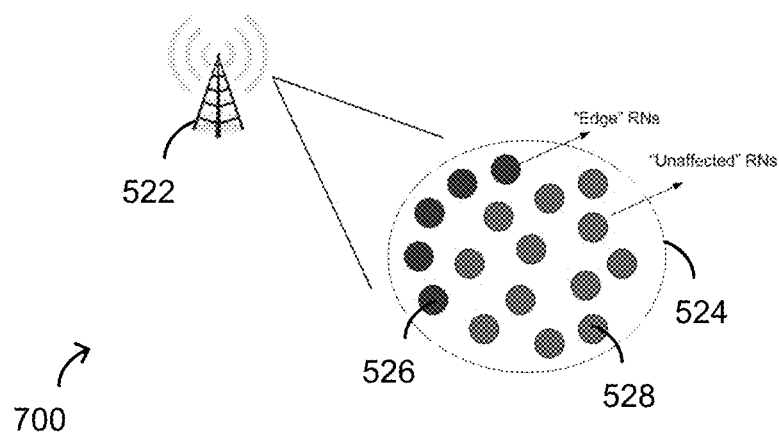
FIG. 11 illustrates how a small cell RAN may be affected by the presence of near or adjacent macro cells.

FIG. 11 illustrates how systems and methods according to present principles may be affected by the presence of near or adjacent macro cells. These methods in general can also be applied to any external cells (like picos, micros, or isolated small cells or femtos, that are not controlled by the services node). In the system 700 shown in the figure, a macro cell 522 is near or adjacent (at least near enough to interfere) with an E-RAN 524. In particular, the macro cell 522 interferes with certain edge RNs 526, leaving other RNs 528 unaffected.

In this regard it is noted that in an enterprise RAN deployment with a centralized control/SN, macro cells can communicate with a single point instead of each of the small cells. This allows the SN to impose ICIC restrictions on "edge-cells" that are in the macro-interference region so as to affect their efficiency only "as needed". This is illustrated in the figure below. As shown, most of the RNs in the indoor network are not affected due to penetration loss in the building. Further, the SN can jointly configure ICIC schemes within the small-cell network taking such into account.

Various solutions are possible. In one, the macro cell 522 can communicate a first interference information, in particular, sub-bands that can expect to see higher interference from the macro cell, and thus allowing the small cell network to avoid transmissions in such sub-bands. In another solution, the macro cell 522 can communicate a second interference information, in particular, sub-bands for which the macro cell 522 expects to lower its own transmission level (i.e., to use a lower transmit power or duty cycle of transmissions), and thus which can then preferentially be used by the small cell network.

An example of the first interference information is the uplink High Interference Indicator (HII), which is essentially a mechanism indicating an intention of neighboring cells to schedule high power in specific bands, e.g., to imply transmission from cell-edge UEs. An example of second interference information is a downlink Relative Narrow Band Transmit Power (RNTP), defined in the LTE specifications, which is defined as the expectation of a cell to reduce transmit power in certain RBs communicated to neighbor cells. While these two examples relate to the frequency domain and are part of the ICIC specification in LTE, similar time domain examples exist and can also be employed. For example, information of Almost Blank Subframes (ABS) is an example of second interference information of subframes in the time domain, where the macro cell does not transmit, or transmits at reduced power, while information of Non-ABS subframes is an example of first interference information, i.e., of subframes in the time-domain that the macro cell will likely transmit at full or higher power. Similar examples combining time and frequency information may also be used. In some cases, such information need not be explicitly communicated by the macro cell network, but instead measured by the small cell network and used accordingly.

In one exemplary implementation, a small cell network (e.g., the FFR modules in the SN), use the above information in the design of the FFR patterns for the individual small cells. In one method, they use the information to restrict or allow transmissions in a subset of edge-cells (or border cells) within the entire small cell network. Such border cells may be defined based on the one or more of several measurements between the small cells and the macro cell, and/or from the UEs connected to the small cell or the macro cell. Examples of such measurements include RSRPs, SNRs, or similar signal and interference level measurements. RSRPs may be available at the UEs from macro cell measurements and at the small cells/RNs from performing sniffer measurements of neighboring macro cells. In another method, the small cell network may use the first and/or second interference information to define cell-edge or cell-center bands for the FFR pattern design.

In a specific example, the first interference information of highly-interfered sub-bands could be used as a cell-center region (at least in the border RNs, border clusters, or over the whole network) and the second interference information of low-interfered sub-bands could be used as a cell-edge region (again, at least in the border RNs, border clusters, or over the whole network). In one method, the cell-edge bands assigned to a border or other RN within the cell-edge region of the corresponding RN cluster (as defined in earlier embodiments) could be chosen to be the sub-band with the least expected macro cell interference. In another specific example, the FFR algorithm may consider the detected macro cells at the border RN (or more generally any RN), and the available first or second interference information of the corresponding macro cells, as bases in which to choose the cell-edge sub-band.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable non-transient media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of allocating frequencies in a radio access network (RAN) that includes a plurality of radio nodes each associated with a cell and a services node operatively coupled to the radio nodes, the method comprising:
dividing the radio nodes (RNs) in the RAN into a plurality of clusters of RNs;
generating a fractional frequency reuse (FFR) pattern for each cluster;
allocating transmission resources to the radio nodes in each cluster in accordance with the respective FFR pattern that is generated for each cluster, wherein dividing the RNs into the plurality of clusters is performed by the services node, the services node providing connectivity to a core network, wherein the cell associated with each RN includes a cell interior and a cell edge and generating the FFR pattern for each cluster includes allocating a common center band of frequencies to the RNs for use by UEs in the cell interior of each cell in each cluster and cell edge frequencies are allocated to the RNs for use by UEs transmitting or receiving high priority messages.

2. The method of claim 1, wherein the FFR patterns for all the clusters collectively define a system-wide FFR pattern and further comprising adjusting the FFR pattern for one or more of the clusters to reduce inter-cluster edge band interference.

3. The method of claim 1, wherein dividing the RNs into a plurality of clusters includes dividing the RNs into a plurality of clusters so that interference between RNs within a cluster is greater than interference between RNs in different clusters.

4. The method of claim 1 wherein generating and allocating the transmission resources is performed by the services node.

5. The method of claim 1, wherein dividing the RNs into the plurality of clusters includes receiving operator-selectable values for a total number of clusters in the RAN and a number of RNs to be assigned to each cluster and further comprising dividing the RNs into the plurality of clusters based at least in part on the received operator-selectable values.

6. The method of claim 1, wherein the RAN has an RN topology and dividing the RNs into the plurality of clusters is performed using the RN topology as input data.

7. The method of claim 6, further comprising determining the RN topology using positional information specifying a physical location of each RN.

8. The method of claim 6, further comprising determining the RN topology using a relative metric associated with pairs of RNs.

9. The method of claim 8, wherein the relative metric includes pair-wise RSRPs, RF pathloss between cells, per-cell transmit power, or any combination thereof.

10. The method of claim 1, wherein dividing the RNs into the plurality of clusters is performed using a hierarchical clustering algorithm.

11. The method of claim 10, wherein the hierarchical clustering algorithm is Ward's Agglomerative Hierarchical Clustering Algorithm.

12. The method of claim 1, wherein generating the FFR pattern for each cluster uses operator-specified values for a plurality of parameters as input data.

13. The method of claim 12, wherein the plurality of parameters includes an FFR type specifying at least one criterion for allocating edge bands to the RNs in each cluster.

14. The method of claim 13, wherein the plurality of parameters further includes a number of frequency resource blocks assigned to a center band allocated to the RNs in each cluster for use by UEs in a cell interior of each cell.

15. The method of claim 14, wherein the plurality of parameters further includes a scheduling granularity of the center band specifying a number of frequency resource blocks assigned to the center band which are scheduled together.

16. The method of claim 14, wherein the plurality of parameters further includes a scheduling granularity of the edge band specifying a number of frequency resource blocks assigned to the edge band which are scheduled together.

17. The method of claim 16, wherein the transmission resources are frequencies used for uplink and downlink transmission, the scheduling granularity of the edge band being different for the FFR pattern generated for uplink transmission with respect to the scheduling granularity of the edge band for downlink transmission.

18. The method of claim 13, wherein the FFR type is selected from the group consisting of uniform FFR and load-based FFR, wherein uniform FFR allocates different edge bands of uniform size to each RN in a cluster and load-based FFR allocates to each RN in a cluster different edge bands having a size determined in part on load information obtained from the RNs in each cluster.

19. The method of claim 18, wherein the group further consists of an FFR type in which a subset of RNs in a given cluster share edge bands.

20. The method of claim 18, wherein the load information is selected from the group consisting of a load of each RN in a cluster, the number of active UEs served by each RN in a cluster, and UE-specific information.

21. The method of claim 18, wherein the load information includes UE-specific information selected from the group consisting of RSRP, load, QoS, sub-band channel quality indicators (CQIs), buffer status or latencies, and current or past KPIs maintained per RN or per UE.

22. The method of claim 18, wherein the group further consists of fixed, non-uniform FFR in which fixed, but different edge bands are assigned to a subset of RNs in a given cluster.

23. The method of claim 22, wherein the different edge bands are assigned based at least in part on an RN topology of the RAN.

24. The method of claim 1, wherein the transmission resources are resources used for downlink transmission.

25. The method of claim 1, further comprising updating the FFR pattern for at least one of the clusters at a rate that depends at least in part a signaling load on links between the services node and the RNs in the at least one of the clusters.

26. The method of claim 1, further comprising updating the FFR pattern for at least one of the clusters at a rate that depends at least in part on a rate at which channel conditions change.

27. The method of claim 1, wherein dividing the RNs into the plurality of clusters includes dividing the RNs into the plurality of clusters using GPS coordinates for at least some of the RNs as input data.

28. The method of claim 1, wherein the transmission resources are resources used for uplink transmission.

29. The method of claim 1, wherein the transmission resources are frequencies used for uplink and downlink transmission.

30. The method of claim 29, wherein, for at least one of the clusters, the FFR pattern generated for uplink transmission is the same as the FFR pattern generated for downlink transmission.

31. The method of claim 29, wherein the cell associated with each RN includes a cell interior and a cell edge and further wherein, for at least one of the clusters, a size of the cell interior or cell edge associated with a given one of the RNs for purposes uplink transmission is different from the size of the cell interior or cell edge associated with the given RN for purposes of downlink transmission.

32. The method of claim 1, wherein dividing the RNs into the plurality of clusters is performed using information concerning synchronized transmission of control information by the RNs to the UEs.

33. The method of claim 32, wherein the control information includes physical control channel configuration information.

34. The method of claim 1, further comprising:
receiving interference information from a macro cell; and
responsive to the interference information, adjusting one or more of the FFR patterns to reduce interference between the macro cell and the RNs.

35. The method of claim 34, wherein the interference information specifies selected sub-bands that may experience interference from the macro cell and further comprising adjusting one or more of the FFR patterns to avoid the selected sub-bands.

36. The method of claim 34, wherein the interference information specifies selected sub-bands on which the macro cell operation at reduced transmission levels and further comprising adjusting one or more of the FFR patterns to use the selected sub-bands.

37. The method of claim 1, wherein the transmission resources are transmission frequency blocks.

38. The method of claim 1, wherein the transmission resources are transmission time intervals.

39. The method of claim 1, further comprising updating the FFR pattern for at least one of the clusters at a rate that depends at least in part on a rate at which UE handoff between cells and/or data load changes.

40. A non-transitory computer readable medium, comprising instructions for causing a computing environment to perform the method of claim 1.

41. A method of allocating frequencies in a radio access network (RAN) that includes a plurality of radio nodes each associated with a cell and a services node operatively coupled to the radio nodes, the method comprising:
dividing the radio nodes (RNs) in the RAN into a plurality of clusters of RNs;
generating a fractional frequency reuse (FFR) pattern for each cluster;
allocating transmission resources to the radio nodes in each cluster in accordance with the respective FFR pattern that is generated for each cluster;
updating the FFR pattern for at least one of the clusters at a rate that depends at least in part a signaling load on links between the services node and the RNs in the at least one of the clusters.

42. The method of claim 41, wherein the FFR patterns for all the clusters collectively define a system-wide FFR pattern and further comprising adjusting the FFR pattern for one or more of the clusters to reduce inter-cluster edge band interference.

43. The method of claim 41, wherein dividing the RNs into a plurality of clusters includes dividing the RNs into a plurality of clusters so that interference between RNs within a cluster is greater than interference between RNs in different clusters.

44. The method of claim 41, wherein the cell associated with each RN includes a cell interior and a cell edge and generating the FFR pattern for each cluster includes allocating a common center band of frequencies to the RNs for use by UEs in the cell interior of each cell in each cluster.

45. The method of claim 41, wherein generating and allocating the transmission resources is performed by the services node.

46. The method of claim 45, wherein dividing the RNs into the plurality of clusters is performed by the services node.

47. The method of claim 41, wherein dividing the RNs into the plurality of clusters includes receiving operator-selectable values for a total number of clusters in the RAN and a number of RNs to be assigned to each cluster and further comprising dividing the RNs into the plurality of clusters based at least in part on the received operator-selectable values.

48. The method of claim 41, wherein the RAN has an RN topology and dividing the RNs into the plurality of clusters is performed using the RN topology as input data.

49. The method of claim 48, further comprising determining the RN topology using positional information specifying a physical location of each RN.

50. The method of claim 48, further comprising determining the RN topology using a relative metric associated with pairs of RNs.

51. A method of allocating frequencies in a radio access network (RAN) that includes a plurality of radio nodes each associated with a cell and a services node operatively coupled to the radio nodes, the method comprising:
dividing the radio nodes (RNs) in the RAN into a plurality of clusters of RNs;
generating a fractional frequency reuse (FFR) pattern for each cluster;
allocating transmission resources to the radio nodes in each cluster in accordance with the respective FFR pattern that is generated for each cluster;
updating the FFR pattern for at least one of the clusters at a rate that depends at least in part on a rate at which channel conditions change.

52. The method of claim 51, wherein the FFR patterns for all the clusters collectively define a system-wide FFR pattern and further comprising adjusting the FFR pattern for one or more of the clusters to reduce inter-cluster edge band interference.

53. The method of claim 51, wherein dividing the RNs into a plurality of clusters includes dividing the RNs into a plurality of clusters so that interference between RNs within a cluster is greater than interference between RNs in different clusters.

54. The method of claim 51, wherein the cell associated with each RN includes a cell interior and a cell edge and generating the FFR pattern for each cluster includes allocating a common center band of frequencies to the RNs for use by UEs in the cell interior of each cell in each cluster.

55. The method of claim 51, wherein generating and allocating the transmission resources is performed by the services node.

56. The method of claim 55, wherein dividing the RNs into the plurality of clusters is performed by the services node.

57. The method of claim 51, wherein dividing the RNs into the plurality of clusters includes receiving operator-selectable values for a total number of clusters in the RAN and a number of RNs to be assigned to each cluster and further comprising dividing the RNs into the plurality of clusters based at least in part on the received operator-selectable values.

58. The method of claim 51, wherein the RAN has an RN topology and dividing the RNs into the plurality of clusters is performed using the RN topology as input data.

59. The method of claim 58, further comprising determining the RN topology using positional information specifying a physical location of each RN.

60. The method of claim 58, further comprising determining the RN topology using a relative metric associated with pairs of RNs.

61. A method of allocating frequencies in a radio access network (RAN) that includes a plurality of radio nodes each associated with a cell and a services node operatively coupled to the radio nodes, the method comprising:
dividing the radio nodes (RNs) in the RAN into a plurality of clusters of RNs;
generating a fractional frequency reuse (FFR) pattern for each cluster;
allocating transmission resources to the radio nodes in each cluster in accordance with the respective FFR pattern that is generated for each cluster, wherein the transmission resources are frequencies used for uplink and downlink transmission, the cell associated with each RN including a cell interior and a cell edge and further wherein, for at least one of the clusters, a size of the cell interior or cell edge associated with a given one of the RNs for purposes uplink transmission is different from the size of the cell interior or cell edge associated with the given RN for purposes of downlink transmission.

62. The method of claim 61, wherein the FFR patterns for all the clusters collectively define a system-wide FFR pattern and further comprising adjusting the FFR pattern for one or more of the clusters to reduce inter-cluster edge band interference.

63. The method of claim 61, wherein dividing the RNs into a plurality of clusters includes dividing the RNs into a plurality of clusters so that interference between RNs within a cluster is greater than interference between RNs in different clusters.

64. The method of claim 61, wherein the cell associated with each RN includes a cell interior and a cell edge and generating the FFR pattern for each cluster includes allocating a common center band of frequencies to the RNs for use by UEs in the cell interior of each cell in each cluster.

65. The method of claim 61, wherein generating and allocating the transmission resources is performed by the services node.

66. The method of claim 65, wherein dividing the RNs into the plurality of clusters is performed by the services node.

67. The method of claim 61, wherein dividing the RNs into the plurality of clusters includes receiving operator-selectable values for a total number of clusters in the RAN and a number of RNs to be assigned to each cluster and further comprising dividing the RNs into the plurality of clusters based at least in part on the received operator-selectable values.

68. The method of claim 61, wherein the RAN has an RN topology and dividing the RNs into the plurality of clusters is performed using the RN topology as input data.

69. The method of claim 68, further comprising determining the RN topology using positional information specifying a physical location of each RN.

70. The method of claim 68, further comprising determining the RN topology using a relative metric associated with pairs of RNs.

71. A method of allocating frequencies in a radio access network (RAN) that includes a plurality of radio nodes each associated with a cell and a services node operatively coupled to the radio nodes, the method comprising:

dividing the radio nodes (RNs) in the RAN into a plurality of clusters of RNs;

generating a fractional frequency reuse (FFR) pattern for each cluster;

allocating transmission resources to the radio nodes in each cluster in accordance with the respective FFR pattern that is generated for each cluster, wherein dividing the RNs into the plurality of clusters is performed by the services node;

updating the FFR pattern for at least one of the clusters at a rate that depends at least in part a signaling load on links between the services node and the RNs in the at least one of the clusters.

72. The method of claim 71, wherein the FFR patterns for all the clusters collectively define a system-wide FFR pattern and further comprising adjusting the FFR pattern for one or more of the clusters to reduce inter-cluster edge band interference.

73. The method of claim 71, wherein dividing the RNs into a plurality of clusters includes dividing the RNs into a plurality of clusters so that interference between RNs within a cluster is greater than interference between RNs in different clusters.

74. The method of claim 71, wherein the cell associated with each RN includes a cell interior and a cell edge and generating the FFR pattern for each cluster includes allocating a common center band of frequencies to the RNs for use by UEs in the cell interior of each cell in each cluster.

* * * * *